United States Patent [19]
Wilson et al.

[11] Patent Number: 5,406,395
[45] Date of Patent: Apr. 11, 1995

[54] HOLOGRAPHIC PARKING ASSISTANCE DEVICE

[75] Inventors: David T. Wilson, Torrance; John E. Wreede, Azusa; John E. Gunther, Torrance, all of Calif.; James A. Arns, Saline, Mich.

[73] Assignee: Hughes Aircraft Company, Los Angeles, Calif.

[21] Appl. No.: 143,958

[22] Filed: Nov. 1, 1993

[51] Int. Cl.⁶ ............................................. G02B 27/22
[52] U.S. Cl. ..................................... 359/15; 356/153; 356/399
[58] Field of Search ........................ 359/15, 22, 25, 29; 356/153, 399

[56] References Cited
U.S. PATENT DOCUMENTS

| | | | |
|---|---|---|---|
| 4,737,001 | 4/1988 | Moss | 359/22 |
| 4,890,918 | 1/1990 | Monfond | 356/153 |
| 5,343,295 | 8/1994 | Lara et al. | 356/399 |

*Primary Examiner*—Samuel A. Turner
*Attorney, Agent, or Firm*—Leonard A. Alkov; W. K. Denson-Low

[57] ABSTRACT

An optical parking alignment system that includes at least one projector located on a vehicle for projecting a respective image forwardly of the vehicle, whereby alignment of the vehicle is indicated when each respective image is in focus on a screen disposed in front of the vehicle. The projector cam comprise a transparency and an imaging lens, or a hologram and a narrowband light source.

10 Claims, 3 Drawing Sheets

HOLOGRAPHIC PARKING ASSISTANCE DEVICE

BACKGROUND OF THE INVENTION

The disclosed invention is directed generally to vehicle parking assistance apparatus, and more particularly to an optical vehicle parking alignment system that does not require binocular vision.

Electric cars are being developed in response to the need for efficient transportation that produces less pollution and is less dependent on fossil fuels. An electric car typically includes some form of energy storage apparatus such as an array of batteries that produces electricity to power the one or more electric motors of the car. Such batteries need to be periodically charged, which can be conveniently accomplished when the electric car is parked at a home or at a parking lot at which charging energy is available. The simplest mechanism for charging the batteries of an electric car would be a electric cable with a plug at one end for connection to a charging electrical receptacle located at a location where charging can take place. Considerations with such the use of an electric cable include inconvenience as well as the possibility of electric shock when water is present in the proximity of the charging receptacle.

Inductively coupled charging systems have been proposed wherein a primary winding structure located at an inductive charging station inductively couples electromagnetic energy to a secondary winding structure mounted at the front of an electric vehicle. An important consideration with an inductively coupled charging system is the necessity of precise alignment between the secondary winding structure on the vehicle and the primary winding structure.

Possible mechanisms for assisting in the alignment of an electric car relative to a primary winding structure of an inductively coupled charging system include parking assistance mechanisms such as vehicle perimeter markers in the form of marker holograms or retractable antenna like devices, tire chocks that prevent further forward motion so as to stop a vehicle at an intended position, and a light-weight ball suspended on a string and located such that a vehicle is at an intended location when the ball touches the vehicle windshield. A consideration with the perimeter markers is the need for binocular vision, and some people use predominantly one eye. Even with binocular vision, accuracy may be limited since visual judgment based on experience with the perimeter markers is required. Considerations with tire chocks include the variation in longitudinal distance between the front tires and a primary winding structure of an inductively coupled charging system for different cars, and the lack of information as to lateral position. Similarly, considerations with the suspended ball include the variation in longitudinal distance between the windshield and the primary winding structure for different cars, and the lack of information as to lateral position.

SUMMARY OF THE INVENTION

It would therefore be an advantage to provide a parking alignment system that does not require difficult visual judgment.

Another advantage would be to provide a parking alignment system that can be configured for different vehicle dimensions.

A further advantage would be to provide a parking alignment system that provides lateral position information and longitudinal position information.

The foregoing and other advantages are provided by the invention an optical parking alignment system that includes at least one projector located on a vehicle for projecting a respective image forwardly of the vehicle, whereby alignment of the vehicle is indicated when each respective image is in focus on a screen disposed in front of the vehicle. The projector cam comprise a transparency and an imaging lens, or a hologram and a narrowband light source.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
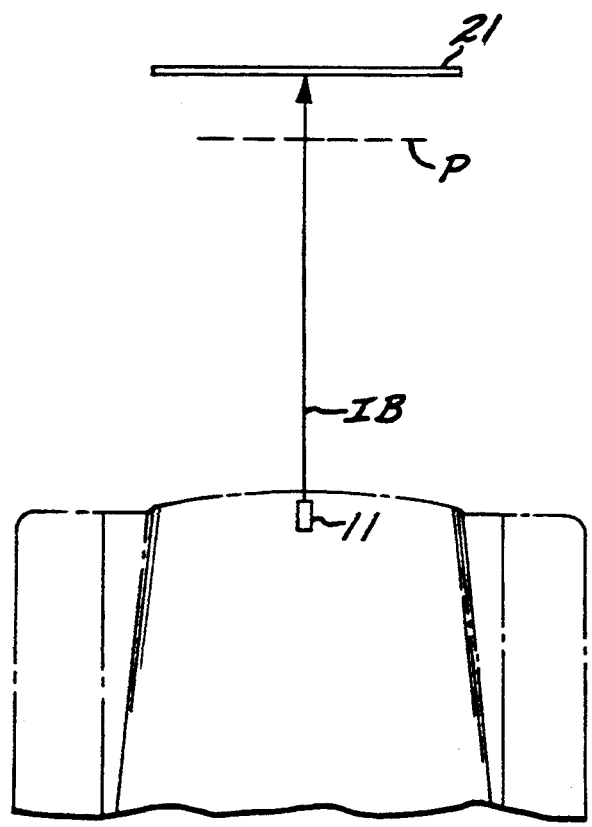
FIG. 1 is a schematic top plan view illustrating an optical parking alignment system in accordance with the invention which includes an optical image projector in a vehicle for projecting an image on a screen whose state of focus and position on the screen are indicative of the position of the vehicle relative to a desired parking position.

In the following detailed description and in the several figures of the drawing, like elements are identified with like reference numerals.

The subject invention is directed to optical parking alignment systems that provide assistance to a vehicle operator in conjunction with parking a vehicle into a desired parked position wherein the front end of the vehicle is aligned in close proximity to apparatus with which the vehicle needs to be closely aligned, such as a primary winding structure that together with a secondary winding structure on the front of an electrically powered vehicle form an inductive charging system. Generally, an optical parking alignment system in accordance with the invention provides position guidance as the vehicle is moved forwardly toward the desired parked position. In the desired parked position, a vehicle is at a proper horizontal angle and in a proper later position; i.e., the longitudinal axis of the vehicle is at the proper horizontal angle and the side to side position of the vehicle is proper. Also, the vehicle is at an appropriate longitudinal position; i.e., the front of the vehicle is at a proper distance from a reference. In order to guide a vehicle operator, the parking alignment system of the invention provides indications of whether the vehicle is at the proper lateral position, whether the vehicle is at the proper longitudinal position, and to some degree whether the vehicle is at the proper horizontal angle.

Referring now to FIG. 1, set forth therein is a schematic top plan view illustrating an optical parking alignment system in accordance with the invention which includes an optical image projector 11 located in the front portion of a vehicle. The image projector 11 produces an imaging beam IB that produces a real image at a predetermined image plane P that is represented as a line in FIG. 1 for convenience. The horizontal angle of the imaging beam IB is parallel to the longitudinal axis of the vehicle and the vertical angle is preferably above horizontal such that the beam is tilted upward. The upward tilt of the beam reduces the possibility of illuminating the eyes of a person in front of the vehicle, for example in another vehicle, and moreover allows for discrimination of longitudinal position, as described further herein. The image plane P is not limited to being orthogonal to the imaging beam IB and can be tilted about a horizontal axis.

Figure 2:
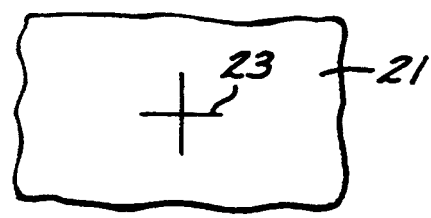
FIG. 2 is a schematic front elevational view of a reference cross-hair target disposed on the screen of the optical alignment system of FIG. 1.
Figure 3:
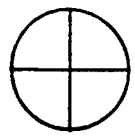
FIG. 3 is a schematic view illustrating an illustrative example of an image that can be utilized in the optical parking alignment system of FIG. 1.

The image beam IB illuminates a screen 21 when the front of the vehicle is oriented toward the screen 21 which includes a reference cross-hair target 23 disposed thereon, as shown in the elevational view of FIG. 2. The screen 21 is preferably vertical and orthogonal to the longitudinal axis of a vehicle in the desired parked position, and the reference cross-hair target 23 is preferably approximately at eye level for a vehicle operator sitting in the vehicle, which can be achieved by originating the imaging beam IB from a location below eye level and tilting the beam upwardly. The screen 21 is accurately positioned with respect to the stationary primary winding structure (not shown) as to which the vehicle is to be aligned, and the horizontal angle and the vertical angle of the imaging beams have a fixed geometrical relationship relative to the desired parked position of the vehicle. For example, for the particular implementation wherein the vertical angle of the imaging beam is above horizontal and the horizontal angle of the imaging beam is parallel to the longitudinal axis of the vehicle and coplanar with the longitudinal axis in a vertical plane, the screen 21, the cross-hair target 23, and the imaging beam IB are positioned and oriented such that when the vehicle is properly positioned longitudinally and laterally for the desired parked position, the image produced by the imaging beam is at the proper position relative to the cross-hair target and at least a portion of the image vertically spanning the horizontal line of the cross-hair target is in focus. In particular, if the image plane is not configured to be coincident with the screen 21 when the vehicle is properly positioned, only a portion of the image that vertically spans the horizontal line of the cross-hair target will be in focus. When the vehicle is not at the proper longitudinal position, the image on the screen will be at the wrong position relative to the cross-hair target and the portion of the image intended to span the horizontal line of the cross-hair target will be out of focus. By way of illustrative example, the image produced by the imaging beam can comprise a dark cross-hair reticle on a light circularly shaped background, as schematically illustrated in FIG. 3.

In use, the vehicle is driven toward the screen 21, and the position and change of focus of the projected image are interpreted to guide the vehicle to the desired parking position. Generally, the longitudinal position is evaluated from the location of the image on the screen relative to the horizontal line of the reference cross-hair target, while the lateral position is evaluated from the location of the image on the screen relative to the vertical line of the reference cross-hair target. The horizontal angle of the longitudinal axis of the vehicle relative to the desired parking angle is evaluated as the vehicle is moved toward the screen. More particularly, if the portion of the image intended to be on the horizontal line of the reference cross-hair target is above the horizontal line of the reference cross-hair target 23, the vehicle is too far from the screen; and if the portion of the image intended to be on the horizontal line of the reference cross-hair target is below the horizontal line of the reference cross-hair target 23, the vehicle is too close. If the image is not properly positioned laterally relative to the vertical line of the reference cross-hair target, the vehicle is too far to one side as indicated by the lateral offset of the image from the vertical line of the cross-hair target. If the image is properly position laterally relative to the vertical line of the reference target 23 as the vehicle is moved closer to the screen 21, the horizontal angle of the longitudinal axis is proper. Depending upon the lateral extent of image, deviation from the desired horizontal angle can be indicated when one side of the image on the screen is in better focus that the other side. For example, if the left side of the projected image is in better focus, the left side of the screen is closer to the vehicle and thus the vehicle is angled to the right. A further embodiment of the invention described further herein utilizes two image projectors to provide for more accurate horizontal angle alignment.

Figure 4:
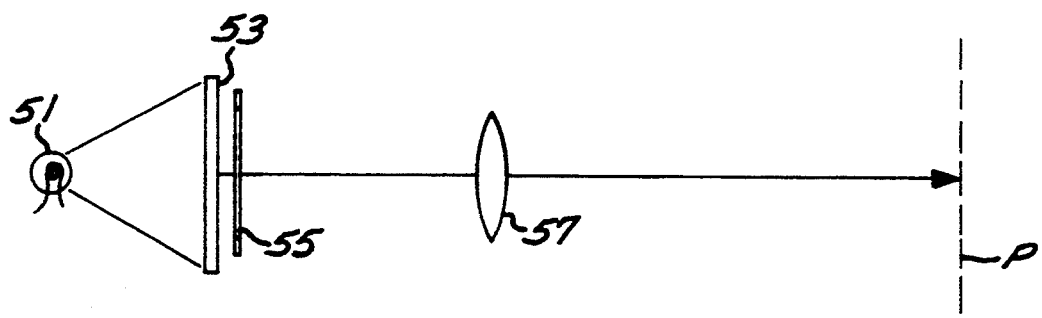
FIG. 4 sets forth a schematic view of a non-holographic optical image projector that can be utilized in the optical parking alignment system of FIG. 1.

Referring now to FIG. 4, schematically depicted therein by way of illustrative example is a non-holographic implementation of the image projector of the optical parking alignment system of FIG. 1. The image projector of FIG. 4 includes a lamp 51 that provides its output to one side of a diffuser 53. A transparency 55 containing the pattern of the desired projected image is positioned adjacent the other side of the diffuser 53, and a projection lens system 57, represented by a simple lens, images the output of the transparency 55 to an image plane P.

Figure 5:
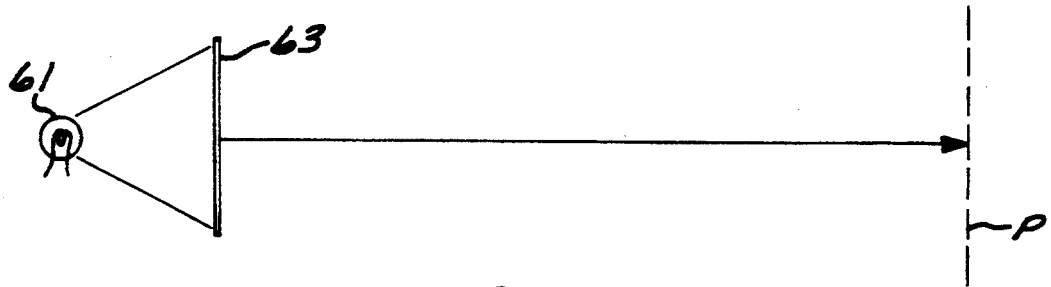
FIG. 5 sets forth a schematic view of a holographic optical image projector that can be utilized in the optical parking alignment system of FIG. 1.

Referring now to FIG. 5, schematically depicted therein by way of illustrative example is a holographic implementation of the image projector of the optical parking alignment system of FIG. 1. The image projector of FIG. 5 includes a narrowband light source 61 that provides its output to one side of an imaging transmission hologram 63. The transmission hologram diffracts the light received from the narrowband light source to produce an image of the object recorded in the hologram at an image plane P.

Figure 6:
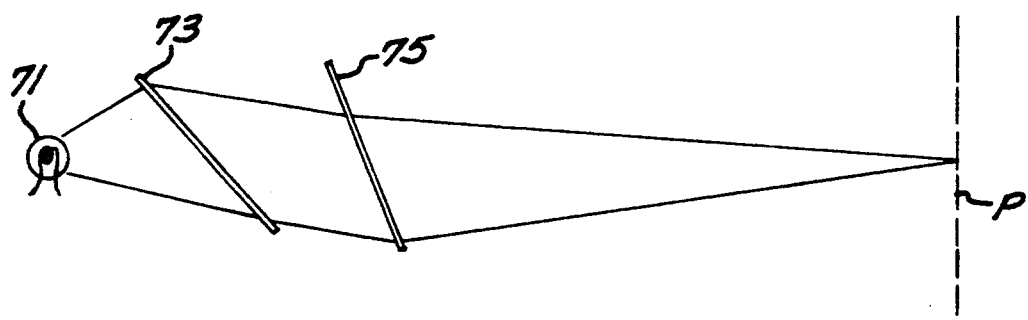
FIG. 6 sets forth a schematic view of a dispersion compensated holographic optical image projector that can be utilized in the optical parking alignment system of FIG. 1.

Referring now to FIG. 6, schematically depicted therein by way of illustrative example is a further holographic implementation of the image projector of the optical parking alignment system of FIG. 1. The image projector of FIG. 6 includes a broad band light source 71 that provides its output to one side of a dispersion compensating hologram 73. The output of the dispersion compensating hologram 73 is received by an imaging transmission hologram 75 which diffracts the light received from the dispersion compensating hologram 75 to produce an image of the object recorded in the imaging hologram at an image plane P.

Figure 7:
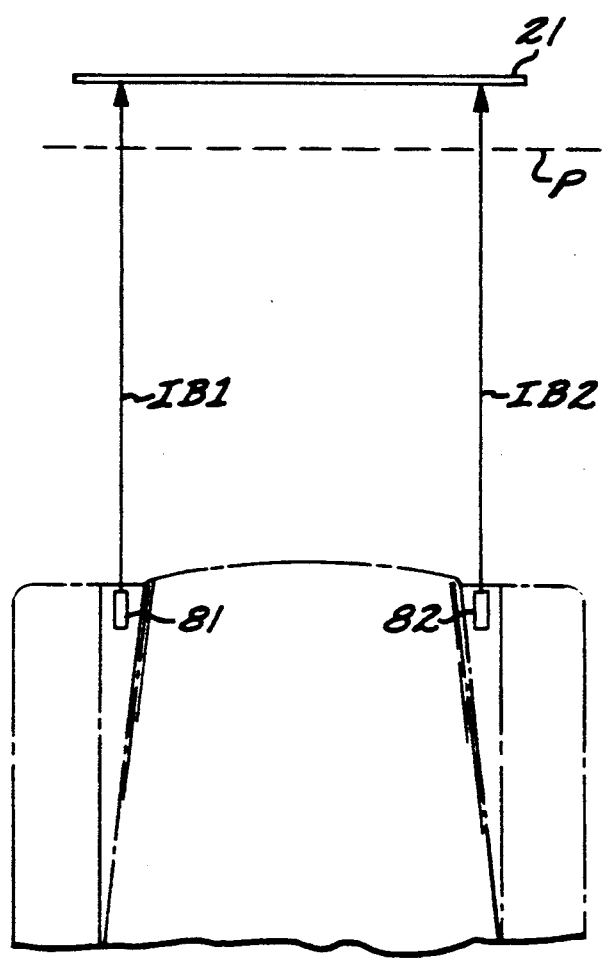
FIG. 7 is a schematic top plan view illustrating an optical parking alignment system in accordance with the invention which includes first and second optical image projectors in a vehicle for projecting first and second images on a screen whose respective states of focus and positions on the screen are indicative of the position of the vehicle relative to a desired parking position.

Referring now to FIG. 7, set forth therein is a schematic top plan view illustrating an optical parking alignment system in accordance with the invention which includes a left and right image projectors 81, 82 which are respectively located in the front portion of a vehicle on the left and right sides of the longitudinal axis of the vehicle. The image projectors 81, 82 produce imaging beams IB1, IB2 which are horizontally parallel to the longitudinal axis of the vehicle and produce respective real images at a predetermined image plane P represented in FIG. 7 by a line for convenience of illustration. By way of illustrative example, the imaging beams IB1, IB2 are tilted upwardly relative to horizontal at the same vertical angle.

The image beams IB1, IB2 illuminate a screen 21 when the front of the vehicle is oriented toward the screen 21 which includes first and second reference cross-hair targets disposed thereon. The screen 21 is preferably vertical and orthogonal to the longitudinal axis of a vehicle in the desired parked position, and respective reference cross-hair targets for the beams are disposed on the screen, preferably approximately at eye level for a vehicle operator sitting in the vehicle, which can be achieved by originating the imaging beams IB1, IB2 from locations below eye level and tilting the beams upwardly. The screen 21 is accurately positioned with respect to the stationary primary winding structure (not shown) as to which the vehicle is to be aligned, and the horizontal angles and the vertical angles of the imaging beams have a fixed geometrical relationship relative to the desired parked position of the vehicle. For example, for the particular implementation wherein the vertical angles of the imaging beams are above horizontal and the horizontal angles of the imaging beams are parallel to the longitudinal axis of the vehicle, the screen 21, the cross-hair targets thereon, and the imaging beams IB1, IB2 are positioned and oriented such that when the vehicle is properly positioned longitudinally and laterally for the desired parked position, the respective images produced by the imaging beams are at the proper positions relative to respective cross-hair targets and at least respective portions of each image that vertically span the respective horizontal lines of the respective cross-hair targets are in focus. In particular, if the image plane is not configured to be coincident with the screen 21 when the vehicle is properly positioned, only the portion of the images that respectively vertically span the respective horizontal lines of the respective cross-hair targets will be in focus. When the vehicle is not at the proper longitudinal position, the images on the screen will be at the wrong positions relative to the respective cross-hair target and the portions of the images intended to respectively span respective horizontal lines of the respective cross-hair targets will be out of focus. By way of illustrative example, the images produced by the imaging beams can comprise respective dark cross-hairs on respective light circularly shaped background areas.

The optical parking alignment system of FIG. 7 operates similarly to the optical parking alignment system of FIG. 1, but with the additional capability of providing a clearer indication of whether the horizontal angle of the vehicle is proper. In particular, both images will be in focus only when the horizontal angle of the vehicle is proper and the vehicle is at the proper longitudinal position. Thus, if one image is in focus while the other is not, then the horizontal angle of the vehicle is not proper. For example, if the left side image comes into focus before the right side image, the vehicle is angled to the right of the proper horizontal angle.

Although the foregoing has been a description and illustration of specific embodiments of the invention, various modifications and changes thereto can be made by persons skilled in the art without departing from the scope and spirit of the invention as defined by the following claims.

What is claimed is:

1. A vehicle parking alignment system for use with a vehicle having a longitudinal axis and a front end, comprising:

a screen located so as to be in front of a vehicle that is in a desired parked position, said screen having a predetermined position and orientation relative to the vehicle in the desired parked position; and image projecting means located on the vehicle for directing an imaging beam toward the screen wherein said imaging beam produces a predetermined image at a predetermined image plane;

whereby alignment of the vehicle relative to the desired parked position is indicated by the position of the predetermined image on said screen and the state of focus of the image on the screen.

2. The vehicle parking alignment system of claim 1 wherein imaging is tilted upwardly relative to horizontal.

3. The vehicle parking alignment system of claim 1 wherein said image projecting means comprises:

a broadband light source;

a transparency containing a pattern of the predetermined image; and a projection lens.

4. The vehicle parking alignment system of claim 1 wherein said image projecting means comprises:

a narrow band light source;

a hologram responsive to said narrow band light source for producing said imaging beam.

5. The vehicle parking alignment system of claim 1 wherein said image projecting means comprises:

a light source;

a dispersion compensating hologram responsive to said light source for providing a first hologram output;

an imaging hologram responsive to said first hologram output for producing said imaging beam.

6. A vehicle parking alignment system for use with a vehicle having a longitudinal axis and a front end, comprising:

a screen located so as to be in front of a vehicle that is in a desired parked position, said screen having a predetermined position and orientation relative to the vehicle in the desired parked position; and a first image projecting means located on the vehicle laterally spaced from the longitudinal axis and on a first side of the longitudinal axis, said first image projecting means directing a first imaging beam toward the screen wherein said first imaging illumination produces a first predetermined image at a predetermined image plane;

a second image projecting means located on the vehicle laterally spaced from the longitudinal axis and on a second side of the longitudinal axis, said second image projecting means directing a second imaging beam toward the screen wherein said second imaging beam produces a second predetermined image at the predetermined image plane;

whereby alignment of the vehicle relative to the desired parked position is indicated by the positions of the first and second predetermined images on said screen and the respective states of focus of the images on the screen.

7. The vehicle parking alignment system of claim 6 wherein said first and second imaging beams are tilted upwardly relative to horizontal.

8. The vehicle parking alignment system of claim 6 wherein each of said first and second imaging projecting means comprises:
   a broadband light source;
   a transparency containing an image of the respective predetermined image; and
   a projection lens.

9. The vehicle parking alignment system of claim 6 wherein each of said first and second image projecting means comprises:
   a narrow band light source;
   a hologram responsive to said narrow band light source for producing said respective imaging illumination.

10. The vehicle parking alignment system of claim 6 wherein each of said first and second image projecting means comprises:
   a light source;
   a dispersion compensating hologram responsive to said light source for providing a dispersion compensating output;
   an imaging hologram responsive to said dispersion compensating output for producing said respective imaging beam.

* * * * *